No. 708,895. W. J. MARTIN. Patented Sept. 9, 1902.
FURNITURE CASTER.
(Application filed Nov. 27, 1901.)
(No Model.)
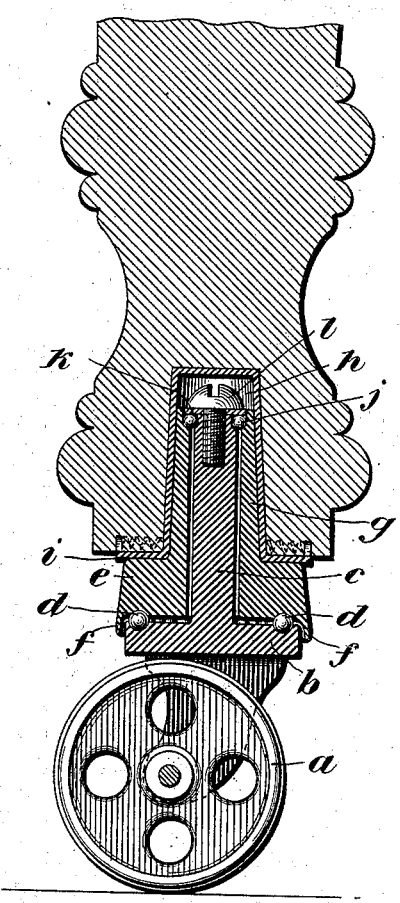

UNITED STATES PATENT OFFICE.

WILLIAM J. MARTIN, OF CATAWISSA, PENNSYLVANIA.

FURNITURE-CASTER.

SPECIFICATION forming part of Letters Patent No. 708,895, dated September 9, 1902.

Application filed November 27, 1901. Serial No. 83,881. (No model.)

*To all whom it may concern:*

Be it known that I, WILLIAM J. MARTIN, a citizen of the United States of America, residing at Catawissa, in the county of Columbia and State of Pennsylvania, have invented certain new and useful Improvements in Furniture-Casters, of which the following is a specification, reference being had to the accompanying drawing, in which is represented a vertical section of the improved caster applied to a furniture-leg.

The object of this invention is to improve and render more durable and efficient that class of furniture-casters in which a floor-roller is journaled in a frame rotatably mounted on antifriction-balls having bearings in a stationary part carried by the article of furniture to which the device is applied, as more fully hereinafter set forth.

Referring to the drawing by letters, $a$ designates the floor-roller, which is journaled in suitable hangers depending from a disk $b$, and rising from the center of this disk is a vertical stem or shank $c$. In the upper side of the disk $b$, near its edge, is formed the lower half of a ball-race, in which a series of antifriction-balls $d$ is confined. A similar half of a ball-race is formed in the upper side of a stationary disk $e$, whose outer edge $f$ overhangs the edge of disk $b$ and forms a sort of dust trap or guard. Formed integral with the plate $e$ is a central upwardly-extending tube $g$, which is slightly tapered and is fitted closely in an upwardly-tapering socket-tube $h$, secured in a hole in the end of the table-leg. The tube $h$ at its lower end is provided with a flange $i$, which when the tube is driven into the furniture-leg bears against the under side of the leg, and against this flange rests the upper side of the stationary part $e$. The shank $c$ extends up through disk $e$ and tube $g$ without touching the same, the shank being held centrally in the tube by means of a series of antifriction-balls $j$, interposed between the upper end of the shank and the upper end of the tube, these balls being removably confined in their raceway by means of a disk $k$, secured removably on the upper end of the shank by means of a central screw $l$. The ball-race for the balls $j$ is formed partly in the side of the shank and partly in the interior wall of the tube $g$, so that all tendency to oscillation or vibration of the shank will be taken up by these balls, while the lower series of balls takes up all the weight of the article of furniture. The disk $k$ fits down in the raceway far enough to come flush with the upper end of the tube $g$, and it will be observed that this disk serves merely to confine the balls, the lateral thrust being taken up entirely by the shank and the surrounding tube. It is essential that the balls $j$ have a lateral bearing against the inner wall of the tube and in the side of the shank, whereby they will be suspended between the shank and the tube and be in a proper position to take up the lateral thrust of the shank and prevent the same coming in contact with the tube except through the medium of said balls.

As will be observed, an important result of my improved construction is that the floor-roller will have the utmost freedom of movement, while at the same time all tilting or oscillation will be done away with, thereby contributing greatly to durability and ease of movement of the article of furniture. It will be observed, further, that the construction of the caster is extremely simple, consisting of but two main parts, and that it is readily attached to and detached from the article of furniture, as the supporting tube and plate may be readily slipped into and out of the socket. The socket-tube is made tapering in order to obtain a tight fit, and thereby avoid the necessity of screw-threads and other devices for fastening the caster in its socket.

It will be observed that I may employ a shorter shank and supporting-tube and make various other changes necessary to adapt this caster to the great variety of articles of furniture capable of being mounted on casters without in the least departing from this invention.

Having thus fully described my invention, what I claim, and desire to obtain by Letters Patent, is—

1. In combination, a supporting plate and tube adapted to be attached to a furniture-leg, the tube rising from the plate and being adapted to extend up into the leg, a rotatable part carrying a floor-roller and consisting of a disk and a shank rising centrally from the disk and extending up into the supporting-tube, a main series of antifriction-balls adapted to receive the weight and confined between and bearing upon the lower surface of the supporting-plate and the upper surface of the rotatable disk, and a supplemental series of balls confined between the shank and the supporting-tube at the upper ends of the same and having a bearing on the inner wall of the tube and the adjacent side of the shank, the balls being thereby suspended between the shank and the tube and so situated as to receive the lateral thrusts of the shank, for the purposes set forth.

2. In combination, a supporting-tube and disk, adapted for connection to an article of furniture, a roller-carrying part consisting of a disk and a shank extending up through said tube, a main series of balls confined between the upper and lower faces of the disk parts, a supplemental series of balls in a ball-race formed between the upper end of the shank and the interior wall of the tube, and a removable disk carried by the shank and confining the supplemental balls in place.

In testimony whereof I hereunto affix my signature, in the presence of two witnesses, this 25th day of November, 1901.

WILLIAM J. MARTIN.

Witnesses:
J. H. VASTINE,
H. A. HARMAN.